United States Patent [19]

Head, Jr. et al.

[11] Patent Number: 5,385,186
[45] Date of Patent: Jan. 31, 1995

[54] SHARP CHAIN CHARGER

[75] Inventors: George W. Head, Jr., Snellville; Reginald R. Landers, Monroe, both of Ga.

[73] Assignee: Forest Products Machinery, Inc.

[21] Appl. No.: 151,013

[22] Filed: Nov. 12, 1993

[51] Int. Cl.$^6$ ............................................. B27C 1/12
[52] U.S. Cl. ................... 144/245 A; 83/367; 83/708; 144/242 R; 144/245 R; 144/378; 198/692; 414/746.3; 414/757
[58] Field of Search .................. 198/692; 83/367, 708; 144/242 R, 242 D, 245 R, 245 A, 378; 414/745.7, 746.3, 757

[56] References Cited

U.S. PATENT DOCUMENTS 3,608,700 9/1971 Nilsson ............................... 198/692

*Primary Examiner*—W. Donald Bray
*Attorney, Agent, or Firm*—Laubscher & Laubscher

[57] ABSTRACT

A sharp chain charger and infeed device for feeding logs in a desired orientation to a sawing machine is characterized by alignment and displacement assemblies for accurately positioning a succession of logs on a sharp chain drive mechanism. The alignment assembly includes a pair of pivotal arms for laterally aligning a log with the longitudinal axis of the sawing machine. A pair of longitudinal rollers are connected with the alignment arms to rotate the log to a selected rotary position. The displacement assembly displaces the alignment assembly longitudinally in the direction of the sawing machine and downwardly beneath the sharp chain, whereby the log is deposited on the moving chain with both longitudinal and vertical components while the desired rotational and aligned orientation of the log is retained for transport to the sawing machine.

12 Claims, 5 Drawing Sheets

SHARP CHAIN CHARGER

BACKGROUND OF THE INVENTION

In a lumber mill, it is important to minimize waste from a log which is to be sawed into lumber. In order to maximize the yield from a log, the log is pre-positioned relative to the sawing machine. Sawing is accomplished automatically by the sawing machine as logs are fed from an infeed device. In order to maximize the efficiency of a lumber mill, the logs are pre-positioned and fed sequentially to the sawing machine.

The present invention relates to an improved charging device for orienting and delivering logs to a sharp chain drive for transporting logs in the proper orientation to a sawing machine. With the sharp chain charger according to the invention, the reliability of the infeed mechanism is increased, and the gap between successive logs fed to the sawing machine is reduced.

BRIEF DESCRIPTION OF THE PRIOR ART

Chain feed devices for feeding logs to a sawing machine are well known in the patented prior art, as evidenced by the U.S. patents to Allen U.S. Pat. No. 3,858,713 and Ackerfeldt U.S. Pat. No. 4,353,276. In the Ackerfeldt device, for example, logs are oriented by a V-shaped support and then dropped onto a moving chain. A non-driven roller is provided to push the log downwardly so that spikes of the chain will impale the log and retain it in its proper orientation for delivery to the sawing machine.

It is also known in the art to provide thumper rollers above a log as it is oriented prior to delivery to the chain drive. The log is deposited on the moving chain and after contact with the chain, the thumper roll system is activated to strike the log from above and force it onto the chain. A considerable force is required in order to accelerate the dead load of the log sitting on the sharp chain into the sharp chain points to impale the log for proper transport.

In conventional chain drive infeed devices without a thumper roll system, there are a number of inherent drawbacks. First, there are an unsatisfactorily high number of logs which are not adequately impaled by the chain drive and thus are not reliably driven to the sawing machine. This results in a high degree of downtime for the infeed apparatus for retrieving and recharging a log which has fallen off of or not been gripped by the chain. Secondly, the infeed device is relatively slow since the chain must be slowed down sufficiently to receive a log and since a prior log must completely clear the loading mechanism before a subsequent log can be oriented and dropped onto the moving chain. Finally, logs which are impaled and transported by the drive chain are often misaligned from the selected orientation, resulting in excessive waste at the sawing machine.

The thumper roll system does not guarantee that the log will be properly oriented and seated on the drive chain. Moreover, it is difficult to time the activation of the thumper roll, and the excessive forces delivered by the thumper roll system increase the wear on the sharp chain charger.

The present invention was developed in order to overcome these and other drawbacks of the prior devices by providing a sharp chain charger which reliably orients and transports a plurality of logs in sequence to a sawing machine without requiring a thumper roll system.

SUMMARY OF THE INVENTION

Accordingly, it is a primary object of the present invention to provide a sharp chain charger for feeding logs to a sawing machine including an alignment device for receiving, supporting, and aligning a log with respect to the longitudinal infeed axis of the saw and a rotating device connected with the aligning device for rotating the log to a selected rotary position for optimum sawing by the sawing machine. A longitudinal displacement mechanism is connected with the alignment device for displacing the alignment device between an upper position and lower position longitudinally offset from the upper position in the direction of the sawing machine. A drive chain is arranged beneath the alignment device and receives the log as the alignment device passes downwardly beyond the chain and transports the log longitudinally to the sawing machine while maintaining the log in the selected aligned and rotary positions in order to obtain a maximum yield from the log.

According to a more specific object of the invention, the alignment device comprises a pair of opposed concave arms pivotally connected at their lower ends with the displacement device. A pair of cylinders are connected with the alignment arms to independently pivot the brackets to align the log. The cylinders are also operable to shift the arms between a closed position wherein a log is supported for rotation and alignment above the drive chain and an open position wherein the arms are spaced beyond the log on the chain while the alignment device is returned to the upper position.

The rotating device includes a pair of elongated ribbed rollers rotatably connected with the upper ends of the alignment arms to rotate the log to a desired rotary position.

According to a preferred embodiment of the invention, a pressing roller is connected with the displacement device and is adapted to press downwardly on a log as it is transferred from the rollers on the alignment device to the drive chain. In addition, a controller is provided to control the operation of the alignment device, the displacement device, and the press roller to accurately deliver a succession of logs to the sawing machine.

BRIEF DESCRIPTION OF THE FIGURES

Other objects and advantages of the invention will become apparent from a study of the following specification, when viewed in the light of the accompanying drawing, in which.

DETAILED DESCRIPTION

Figure 1:
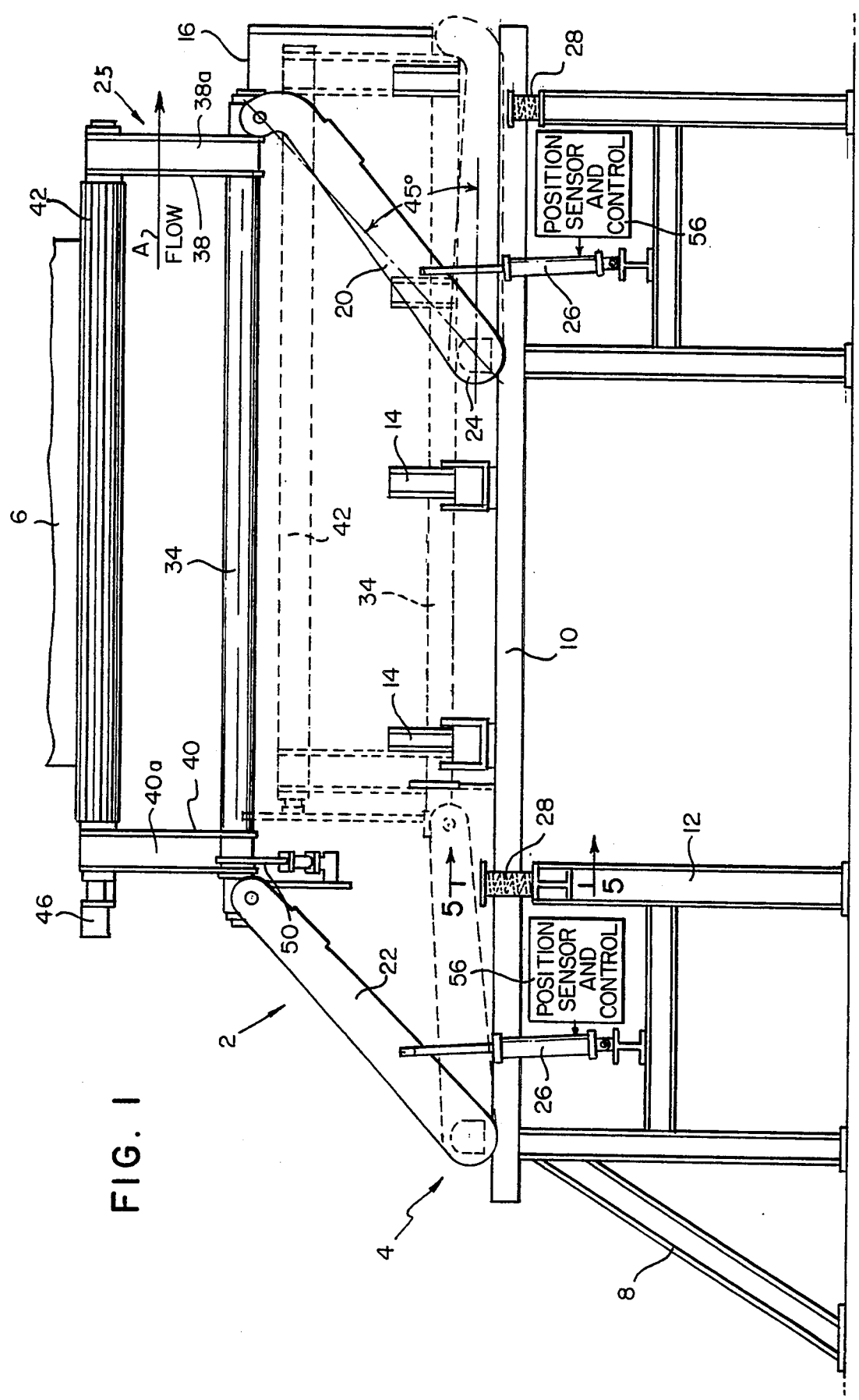
FIG. 1 is a front elevation of the sharp chain charger according to the invention.

The sharp chain charging device according to the invention will first be described with reference to FIGS. 1-3. The invention comprises an upper charging assembly 2 and a lower infeed device 4. The charging assembly orients and delivers logs 6 to the infeed device 4 which in turn transports the logs to a sawing machine (not shown) for sawing the logs into lumber. The infeed device 4 includes a frame 8 which includes a horizontal platform 10 and a plurality of vertical legs 12. If desired, a plurality of shock absorbing devices 14 may be connected with the platform for purposes to be discussed below.

Figure 2:
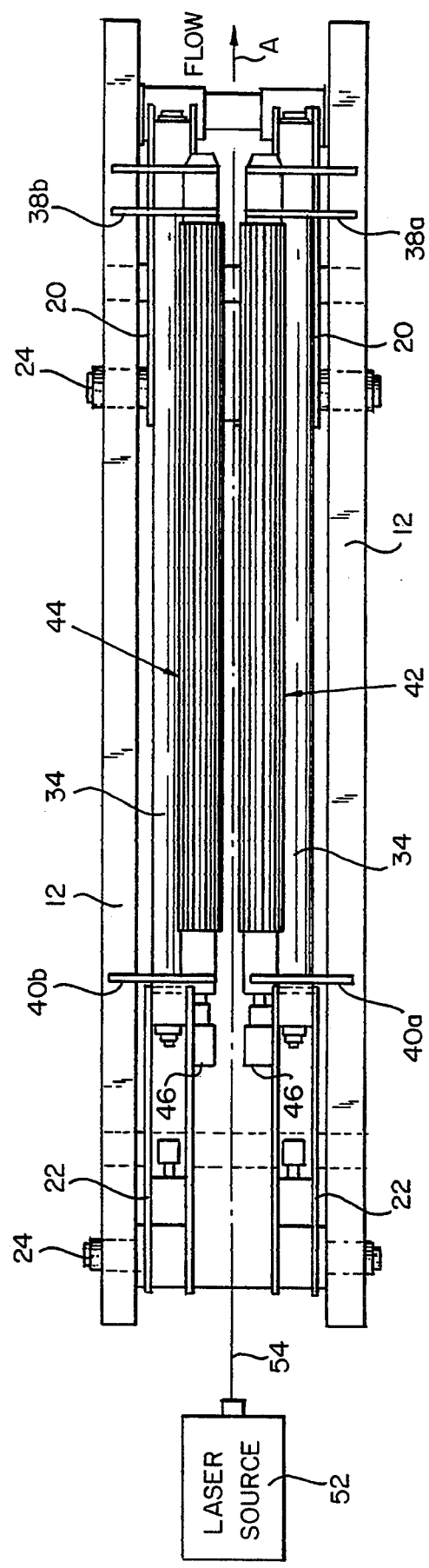
FIG. 2 is a top view of the charger of FIG. 1.

The platform 10 supports a drive or sharp chain 16 which is used to transport logs in a longitudinal direction as shown by the arrow A in FIG. 2 toward the sawing machine. As shown more particularly in FIG. 3, the top of the sharp chain 16 is pointed to impale the log 6 in order to transport it to the sawing machine. Below and on either side of the sharp chain are longitudinally extending metal plates 18 which are connected with the frame 8 and which are adapted to receive the impact of the weight of the log as it is dropped onto the sharp chain as will be developed below.

Referring once again to FIG. 1, the charging assembly 2 is connected with the infeed assembly via front 20 and rear 22 pairs of linkages of a displacement assembly. The linkages are pivotally connected at their lower ends with the frame platform 10 via bearings 24. The upper ends of the linkage pairs 20, 22 are pivotally connected with an alignment assembly 25 which will be discussed in greater detail below.

An operating cylinder 26, such as a hydraulic piston/cylinder, is connected with each linkage to simultaneously pivot the linkages with respect to the frame 8. Alternatively, the linkages can be interconnected via cross beams and a single cylinder can be operated to pivot all of the linkages simultaneously. Pivoting of the linkages displaces the alignment assembly 25 between an upper position where the alignment assembly is above the sharp chain 16 and a lower position, shown by broken lines in FIG. 1, where the alignment assembly is below the sharp chain and longitudinally offset in the direction of the sawing machine with respect to the upper position. FIG. 2 illustrates the alignment assembly in the longitudinally offset lower position. Preferably, the linkages 20, 22 are displaced through an angle of 45° between the upper and lower positions.

Figure 5:
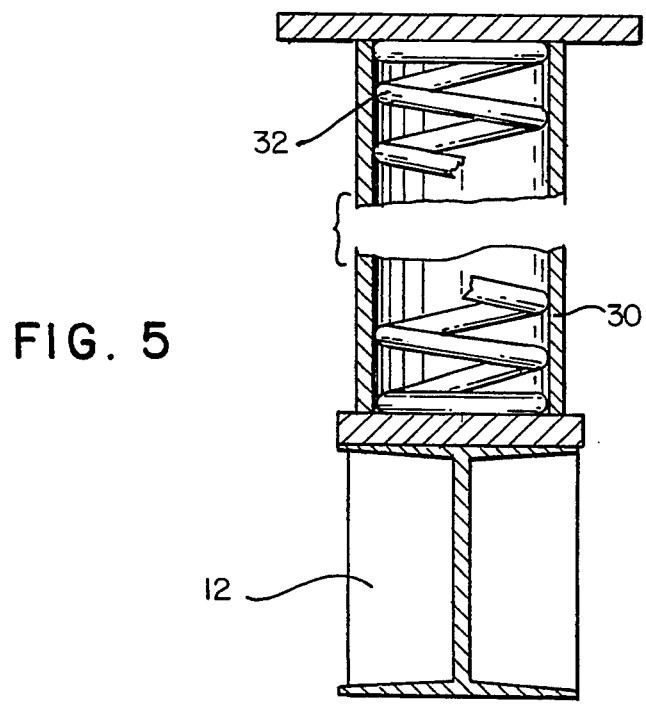
FIG. 5 is a sectional view of a shock absorbing device for the charger frame taken along line 5—5 of FIG. 1.

The frame 8 preferably includes a pair of shock absorbing devices 28 to cushion the linkage arms 20, 22 when they reach their lower position. As shown more particularly in FIG. 5, the shock absorbing devices comprise a sectional housing 30 supported by the platform 10 and a coil spring 32 which dampens the shock forces resulting from the linkages striking the frame 8.

The alignment assembly comprises a pair of longitudinal rods 34 rotatably connected with the upper ends of the displacing linkages 20, 22. As shown in FIGS. 1 and 3, the rods 34 extend parallel to the sharp chain 16 and are spaced on either side thereof. Pivotally connected with the rods via journals 36 are two pairs of concave alignment arms 38, 40. A first pair of alignment arms 38 is arranged toward the front end of the charging assembly adjacent the front linkage 20 and a second pair of identical alignment arms 40 is arranged toward the rear of the assembly adjacent the rear linkage arm 22.

Figure 3:
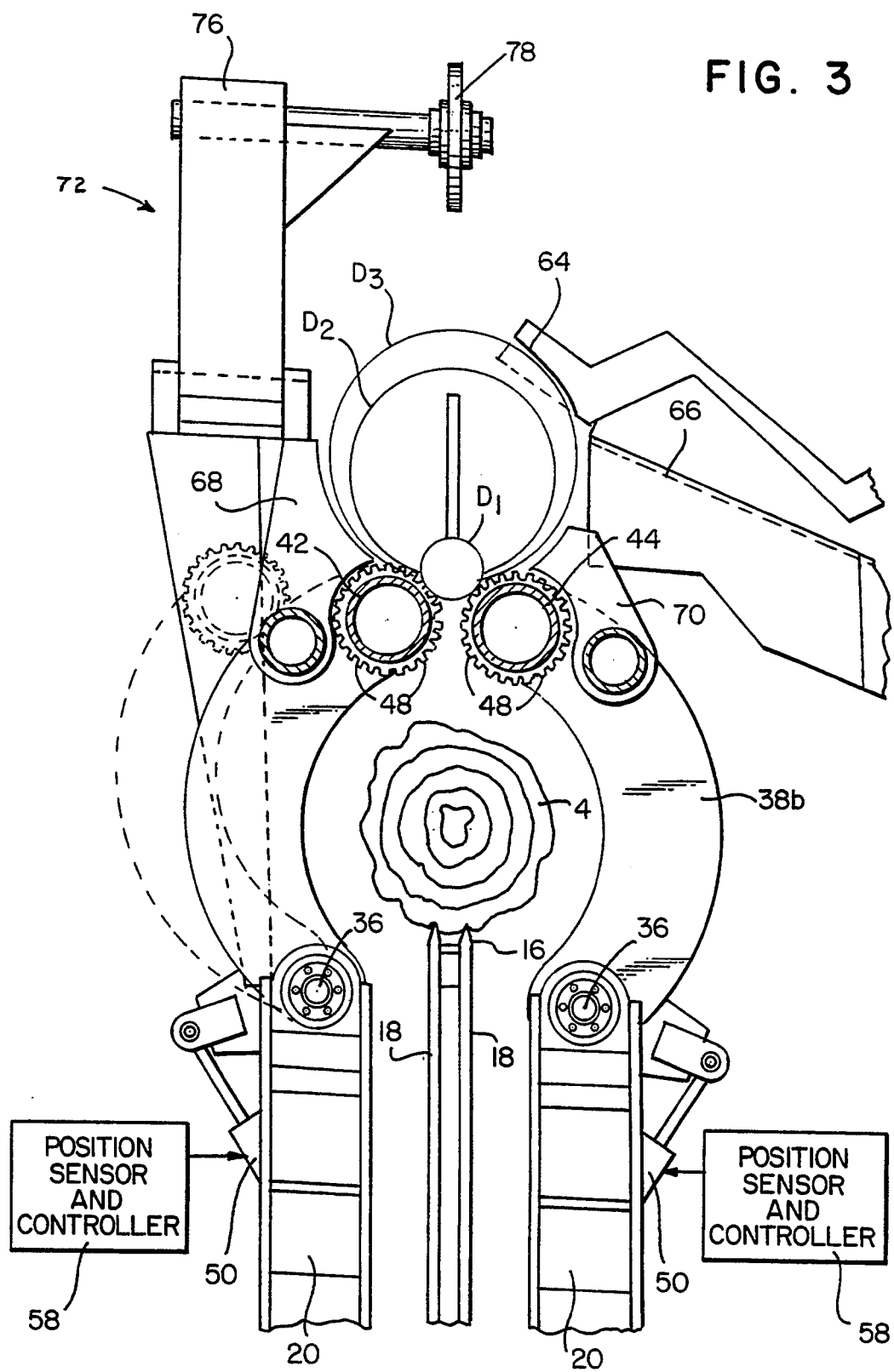
FIG. 3 is a partial side view of the charger of the invention showing different sized logs supported on the rotating rollers connected with the alignment device and illustrating the pressing roller.
Figure 4:
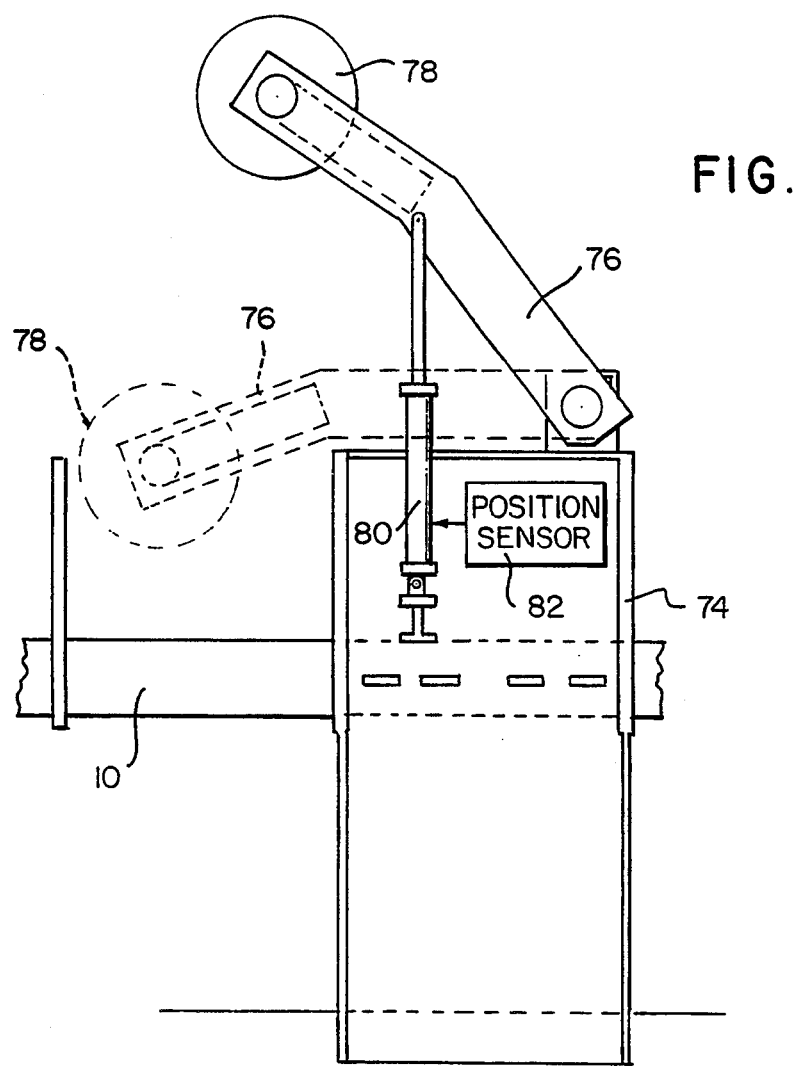
FIG. 4 is a front view of the pressing roller assembly of FIG. 3.

With reference to FIG. 3 which illustrates the front pair of alignment arms 38 with the displacing linkages 20, 22 in the upper position, the concave arms 38a and 38b are arranged on opposite sides of the sharp chain 16 and provide clearance for a log 4 mounted on the sharp chain.

Rotatably connected with the upper ends of the front and rear concave arms on either side of the sharp chain are a pair of longitudinal rollers 42, 44. The roller 42 is connected between the front and rear arms 38a, 40a on one side of the chain and the roller 44 is connected between the front and rear arms 38b, 40b on the other side of the chain. The rollers are driven for rotation by a pair of motors 46. Each roller includes a plurality of longitudinal ribs 48 arranged around the circumference.

An operating cylinder 50 similar to the cylinders 26 is connected with each concave arm 38a, 38b, 40a, 40b of the alignment assembly in order to pivot the arms between a closed position shown by the solid lines in FIG. 3 and an open position shown by the broken lines in FIG. 3. The operating cylinders connected with the aligning arms 38a, 40a on one side of the sharp chain are operated together to pivot the front and rear arms 38a, 40a, and thus the roller 42, in unison. Similarly, the operating cylinders connected with the aligning arms 38b, 40b on the other side of the sharp chain are operated together to pivot the front and rear arms 38b, 40b, and the roller 44, in unison. However, the pairs of front and rear cylinders and arms on opposite sides of the chain are operable independently to align a log supported on the rollers 42, 44 with the longitudinal axis of the sawing machine. For this purpose, a laser source 52 is provided which produces a laser beam 54 parallel to the longitudinal axis of the sawing machine.

A position sensor and control device 56 is connected with each of the displacement assembly linkage operating cylinders 26. Similar position sensor and control devices 58 are connected with the operating cylinders 50 of the alignment arms 38a,b, 40a,b. The operation of the sharp chain 16, the displacement assembly position sensor and controllers 56, and the alignment assembly position sensor and controllers 58 is controlled by both manual 60 and automatic controllers 62 as shown by the block diagram of FIG. 6.

The operation of the sharp chain charger of the invention will now be described. With the linkages 20, 22 and the alignment assembly 25 in the upper position and the alignment arms in their closed position (FIGS. 1 and 3), a first log 4 is deposited from a conventional deposit device 64, 66 onto the rollers 42, 44. The operator of the charger activates the rollers to rotate the log to a desired "horns down" rotary position and also activates one pair of the alignment arm cylinders 50 to partially open the respective pair of arms 38a, 40a or 38b, 40b to laterally shift the log into alignment with the laser beam. It will be noted from FIG. 3 that the rollers 42, 44 and the alignment assembly 25 can easily accommodate logs having different diameters $D_1$, $D_2$, or $D_3$. In this regard, the alignment arms 38, 40 include adjustable guides 68, 70 adjacent the rollers 42, 44 to insure that various sized logs from the deposit device 64, 66 are deposited on the rollers.

After the first log has been rotated and aligned, the cylinders 26 connected with the displacement linkages 20, 22 are activated to displace the linkages and the alignment assembly longitudinally in the direction of flow to the sawing machine and downwardly to the lower position. During displacement, the log is retained on the rollers in the selected rotary and aligned orientation. As the linkages and rollers pass beneath the sharp chain 16 on opposite sides thereof, the first log contacts the chain and is impaled thereby. The sharp chain is driven in the direction of the sawing machine and the log descends toward the chain in the same direction. Because of the longitudinal movement of the log as it contacts the chain, there is a smooth and even contact of the log on the moving chain, whereby the desired rotary and aligned position of the log is retained on the chain.

Just after the log is impaled by the chain (owing to the weight of the log and the downward movement thereof), the alignment cylinders 50 are activated to pivot the alignment arms 38, 40 to the open position and the displacement assembly cylinders are operated to raise the linkages 20, 22 and thus the alignment assembly to the upper position. As the alignment assembly reaches the upper position, the alignment assembly cylinders are activated to pivot the arms back to the closed position to receive a second log. Owing to the concave configuration of the arms 38a,b, 40a,b the alignment assembly can be raised and the arms closed without striking the first log being transported to the sawing machine by the sharp chain. This enables logs to be charged in succession with a minimal gap between successive logs, whereby a greater number of logs can be processed per minute as compared to prior charging devices.

Figure 6:
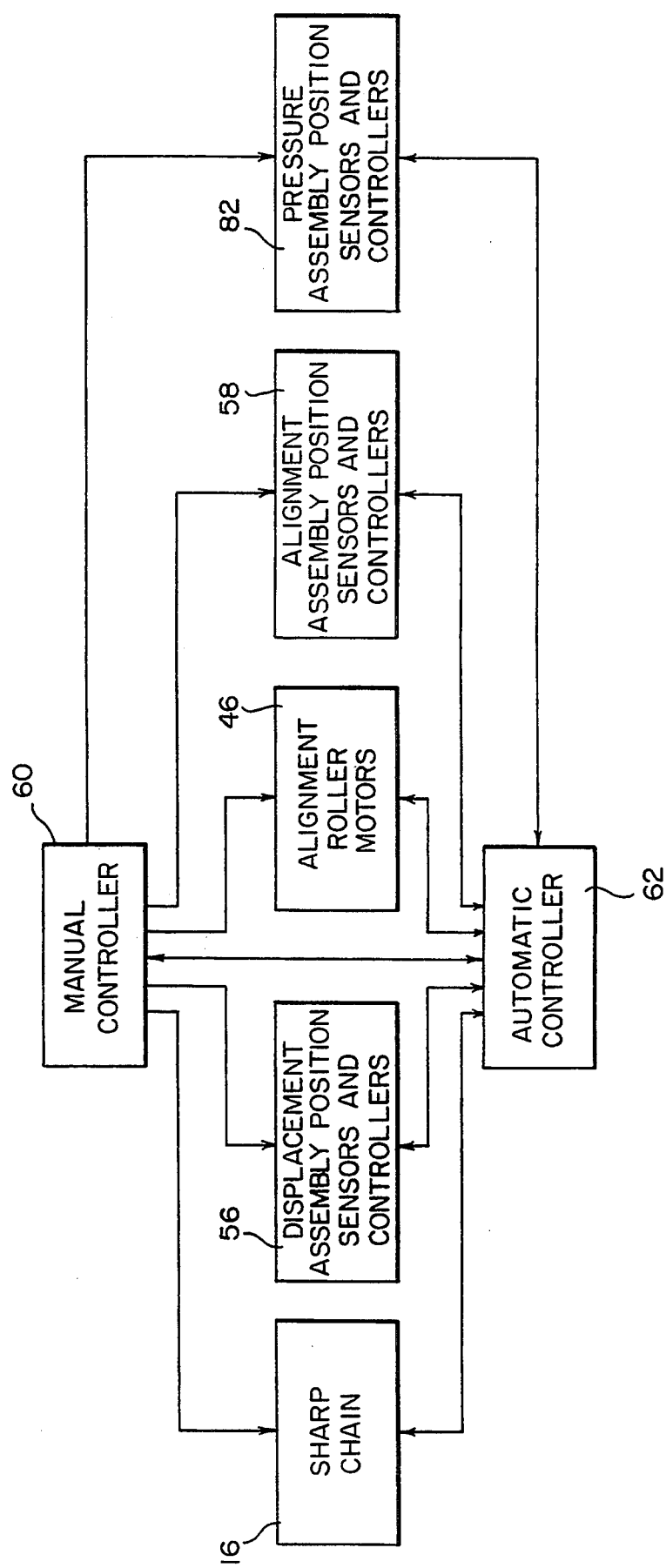
FIG. 6 is a block diagram of a control circuit for operation of the charger of FIG. 1.

According to a preferred embodiment of the invention, a pressure assembly 72 is provided to apply pressure to a log as it is displaced longitudinally and downwardly for transfer from the alignment assembly to the sharp chain. The pressure assembly includes a base 74 pivotally connected with the frame 8 and a swing arm 76 pivotally connected with the base. A non-driven pressure roller 78 is rotatably connected with the swing arm 76. An operating cylinder 80 is connected between the swing arm 76 and the base 74 and is operated by the position sensor and controller 82 under control of the manual and automatic controllers 60, 62 (FIG. 6). A similar cylinder and a position sensor and controller (not shown) are connected between the base and the frame.

The base is pivoted laterally with respect to the frame to position the roller over the axis of the log as shown in FIG. 3. The swing arm is then pivoted downwardly to contact the log after it has been rotated and aligned. As the displacing assembly is activated to move the alignment assembly and log longitudinally and downwardly to the lower position, the pressure roller presses the log against the rollers 42, 44 to retain it in its selected rotary and aligned orientation. The pressure roller continues to press on the log as it contacts the sharp chain and aides in impaling the log on the chain which retains the log in the selected orientation.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. Apparatus for feeding logs to a sawing machine, comprising:
   (a) means for receiving, supporting, and aligning a log with respect to a longitudinal infeed axis of a sawing machine;
   (b) means connected with said aligning means for axially rotating the log to a selected rotary position for optimal sawing by the sawing machine;
   (c) means connected with said aligning means for displacing said aligning means downwardly and longitudinally in the direction of the sawing means; and
   (d) drive means arranged beneath said aligning means for receiving the log as said aligning means are displaced downwardly beyond said drive means, said drive means longitudinally transporting the log, while in the desired aligned and rotary positions, to the sawing machine, thereby to obtain maximum yield from the log.

2. Apparatus as defined in claim 1, and further comprising a frame for supporting said drive means.

3. Apparatus as defined in claim 2, wherein said displacing means comprises front and rear linkages each having one end pivotally connected with said frame and a second end connected with said aligning means, respectively.

4. Apparatus as defined in claim 3, wherein said displacing means further comprises a pair of cylinders connected with said linkages, respectively, for pivoting said linkages with respect to said frame to simultaneously displace said aligning means longitudinally and vertically between an upper position above said drive means and a lower position below said drive means.

5. Apparatus as defined in claim 4, wherein said aligning means comprises an opposed pair of concave arms pivotally connected at a lower end with said displacing means.

6. Apparatus as defined in claim 5, wherein said aligning means further comprises a pair of cylinders connected with said pair of arms, respectively, for independently pivoting said arms with respect to said displacing means in a direction transverse to the longitudinal infeed axis to align the axis of the log with the longitudinal infeed axis.

7. Apparatus as defined in claim 6, wherein said log rotating means comprise a pair of elongated rollers rotatably connected with an upper end of each of said pair of concave arms, respectively.

8. Apparatus as defined in claim 7, wherein said aligning concave arms are pivoted by said cylinders between a closed position wherein said elongated rollers support a first log for rotation and alignment above said drive means and for transport longitudinally and downwardly onto said drive means and an open position wherein said elongated rollers are spaced beyond the first log on said drive means as said displacing means raises said aligning means to receive a second log.

9. Apparatus as defined in claim 8, and further comprising press means including a pressing roller for pressing the first log downwardly against said rollers and said drive means when said displacing means are pivoted to the lower position.

10. Apparatus as defined in claim 9, and further comprising controller means connected with said alignment cylinders, said displacement cylinders and said press means to control the operation thereof for alignment and delivery of a succession of logs to the sawing machine.

11. Apparatus as defined in claim 2, wherein said drive means comprises a drive chain which impales a log upon its receipt.

12. Apparatus as defined in claim 11, wherein said frame includes at least one shock absorbing device for cushioning said frame when said displacing means are moved downwardly beyond said drive means.

* * * * *